United States Statutory Invention Registration [19]

[11] Reg. Number: H761

Quinlan [43] Published: Apr. 3, 1990

[54] PROCESS OF MAKING CONSOLIDATED PROPELLANT CHARGES

[76] Inventor: Joseph B. Quinlan, 1126 Norwalk Rd., Philadelphia, Pa. 19115

[21] Appl. No.: 297,892

[22] Filed: Jan. 17, 1989

[51] Int. Cl.[4] ..... C06B 21/00; C06B 45/10

[52] U.S. Cl. ..... 264/3.1; 264/3.4; 149/19.92

*Primary Examiner*—Matthew A. Thexton
*Assistant Examiner*—Joseph D. Anthony

[57] ABSTRACT

This is an improved process of making consolidated propellant charges by compaction of propellant grains in a mold. The grains are coated with a frangible microcapsule prior to compaction. The inner phase of the microcapsules is a low volatile solvent for the grains.

4 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS OF MAKING CONSOLIDATED PROPELLANT CHARGES

GOVERNMENTAL INTEREST

The invention described herein may be manufactured, used, and licensed by or for the Government for Government purposes without payment to us of any royalties thereon.

FIELD OF USE

This invention relates to an improved process of making consolidated charges by compaction of propellant grains in a mold.

More particularly, this invention relates to the use of microencapsulated solvents to produce consolidated charges by dry compaction.

BACKGROUND OF INVENTION

Consolidated charges are propellant charges made from solid propellant grains having conventional shapes. They may be either solid single base, double base, or triple based propellant grains. Consolidated charges may be used in ammunition having a case or shell. An advantage of consolidated charges is increased performance. This is due to the fact that more propellant can be concentrated in a given volume. Consolidated charges may also be used in caseless ammunition. The reason being that the consolidated charges produced are sufficiently strong so that they may be fed into a gun without a case or shell.

In the past, consolidated charges have been made by initially mixing the individual propellant grains with a solvent or binder solution. Thereafter, the mass is compressed in a mold to form the solid charge. In many cases, if not all cases, during compression, excess solvent is squeezed out of the mass in the mold.

The disadvantages of the prior art are that the mixing apparatus, and the molds, are coated with partially dissolved propellant which is extremely sticky. Once a consolidated charge is molded, the apparatus must be cleaned again prior to a repetition of the process. Further, the solvent is highly flammable, and the excess running out of the mold presents a highly hazardous situation. Also, the exact amount of solvent actually remaining in the consolidated charge is very difficult to control. Due to the fact that the burning rate of the end-item is very dependent on the amount of solvent, performance in the field varies from one consolidated charge to another. This effect is attributed to the fact that the solvent is highly volatile. And, the amount leaving the mold during compression, varies from charge to charge.

It is an object of this invention to provide an improved dry compaction process of making a consolidated propellant charge.

Another object is to provide a process of making a consolidated charge having a reproducible burning rate.

A further object is to provide a process of making a consolidated charge in which the exact amount of solvent in the charge may be easily controlled.

Other objects, and many of the attendant advantages, of this invention will become more apparent from a reading of the following detailed specification and the claims.

SUMMARY OF INVENTION

This invention provides a dry coating of microcapsules to the propellant grains prior to compaction in a mold. When the mass is compressed in the mold, the microcapsules will rupture releasing its inner phase of solvent or binder. The solvent or bidder will then interact with the propellant grains, and a bond will be formed between them. In this manner, the exact amount of solvent or binder can be easily controlled.

The microcapsules are small spherical plastic or wax capsules containing the solvent or binder as an inner phase. They may range in size from several microns to several hundred microns in diameter. In this size and form, the microcapsules constitute a dry free-flowing powder.

There are many microencapsulation techniques available for forming microcapsules of the required size which have dibutylphthalate or another low volatile solvent as the inner phase. Among these are various coacervation, polymer-polymer incompatibility, and non-coacervation techniques. For a complete analysis of these techniques, please see "microencapsulation" by Robert E. Sparks, Kirk-Othmer Encyclopedia of Chemical Technology, Vol. 15, pp. 470–493.

In the preferred embodiment, 12 lbs of microcapsules are formed having a maximum average particle size of 25 microns. They contain dibutylphthalate as the inner phase or core material, and a chemical complex of gelatin and gun arabic as the outer phase. In this embodiment, the microcapsules are formed by complex coacervation as described in U.S. Pat. No. 2,800,457.

At this point in the process, the propellant grains are coated with the microencapsulated dibutylphthalate. 700 lbs. of a single base granular propellant such as nitrocellulose are charged into a coating barrel. The propellant has a seven perforated grain geometry with an average web of 0.018 inches. The propellant grains are already coated with 1.0% ethylene glycol dimethylaerylate deterrent. 35 lbs of isopropyl alcohol containing 1.75 lbs of acetone is added to the barrel, at which time, the barrel is rotated for 5 minutes.

At this stage, 12 lbs of the above microcapsules are added to the barrel in four increments of 3 lbs each. The barrel is rotated for 5 minutes after each increment of microcapsules is added.

When all the microcapsules have been added to the barrel, it is heated to 87° C while continuing to rotate. Rotation is continued at this temperature until all the isopropyl alcohol and acetone carrier has evaporated.

0.1% graphite is added to the barrel, and rotation of the same is continued for another 30 minutes while allowing the barrel to cool to ambient temperature.

At this point, the above granular propellant, which is coated with microcapsules, is molded into a consolidated charge. A weighed amount of the microcapsule-coated propellant is poured into a mold and compressed to a density of 1.4 gms/cc by means of a hydraulic press. The ram of the press is allowed to remain in force for a dwell time of about 10 seconds.

The foregoing disclosure 15 merely illustrative of the above principles of this invention and are not to be interpreted in a limiting sense. I wish it to be understood that we do not desire to be limited to the exact details of construction described because obvious modifications will occur to a person skilled in the art.

What is claimed is:

1. In an improved process of making consolidated propellant charges by compacting propellant grains in a mold, the improvement consisting essentially of coating said propellant grains with a frangible microcapsule having an inner phase being a low volatile solvent for said propellant grains prior to said compacting step.

2. The process of claim 1 wherein said propellant grains are nitrocellulose.

3. The process of claim 2 wherein said solvent is dibutylphthalate.

4. The process of claim 3 wherein said nitrocellulose has a seven perforated geometry with an average web of about 0.018 inches.

* * * * *